United States Patent
Vidma et al.

(10) Patent No.: US 11,732,179 B2
(45) Date of Patent: Aug. 22, 2023

(54) PROPPANT-FIBER SCHEDULE FOR FAR FIELD DIVERSION

(71) Applicant: SCHLUMBERGER TECHNOLOGY CORPORATION, Sugar Land, TX (US)

(72) Inventors: Konstantin Vidma, Sugar Land, TX (US); Anna Dunaeva, Houston, TX (US); Changsheng Xiang, Houston, TX (US); Jazmin Godoy-Vargas, Missouri City, TX (US); Mohan Kanaka Raju Panga, Sugar Land, TX (US); John Thomas Mayo, Stafford, TX (US); Dmitriy Usoltsev, Richmond, TX (US); Jacob Kariampally, Pearland, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/982,154

(22) PCT Filed: Apr. 3, 2019

(86) PCT No.: PCT/US2019/025665
§ 371 (c)(1),
(2) Date: Sep. 18, 2020

(87) PCT Pub. No.: WO2019/195478
PCT Pub. Date: Oct. 10, 2019

(65) Prior Publication Data
US 2021/0024807 A1    Jan. 28, 2021

Related U.S. Application Data

(60) Provisional application No. 62/652,083, filed on Apr. 3, 2018.

(51) Int. Cl.
*E21B 43/267* (2006.01)
*C09K 8/516* (2006.01)
(Continued)

(52) U.S. Cl.
CPC .............. *C09K 8/516* (2013.01); *C09K 8/508* (2013.01); *C09K 8/5045* (2013.01); *C09K 8/514* (2013.01);
(Continued)

(58) Field of Classification Search
None
See application file for complete search history.

(56) References Cited

U.S. PATENT DOCUMENTS 4,478,282 A    10/1984    Nolte et al.
5,330,005 A    7/1994    Card et al.
(Continued)

FOREIGN PATENT DOCUMENTS

WO    2009078744 A1    6/2009
WO    2009078745 A1    6/2009
(Continued)

OTHER PUBLICATIONS

A. Peirce and E. Detournay, "An implicit level set method for modeling hydraulically driven fractures," Comput. Methods Appl. Mech Engrg., vol. 197, pp. 2858-2885, 2008.
(Continued)

Primary Examiner — Andrew Sue-Ako
(74) Attorney, Agent, or Firm — Rushi C. Sukhavasi

(57) ABSTRACT

Methods include pumping a fracturing pad fluid into a subterranean formation under conditions of sufficient rate and pressure to create at least one fracture in the subterranean formation, the fracturing pad fluid including a carrier fluid and a plurality of bridging particles, the bridging particles forming a bridge in a fracture tip of a far field
(Continued)

region of the formation. Methods further include pumping a first plurality of fibers into the subterranean formation to form a low permeability plug with the bridging particles, and pumping a proppant fluid comprising a plurality of proppant particles.

28 Claims, 10 Drawing Sheets

(51) Int. Cl.
<table>
<tr><td>C09K 8/504</td><td>(2006.01)</td></tr>
<tr><td>C09K 8/508</td><td>(2006.01)</td></tr>
<tr><td>C09K 8/514</td><td>(2006.01)</td></tr>
<tr><td>C09K 8/80</td><td>(2006.01)</td></tr>
<tr><td>E21B 33/138</td><td>(2006.01)</td></tr>
</table>

(52) U.S. Cl.
CPC .............. *C09K 8/80* (2013.01); *E21B 33/138* (2013.01); *E21B 43/267* (2013.01); *C09K 2208/08* (2013.01); *C09K 2208/18* (2013.01)

(56) References Cited

U.S. PATENT DOCUMENTS

| | | | |
|---|---|---|---|
| 5,501,274 A | 3/1996 | Nguyen et al. | |
| 5,582,249 A | 12/1996 | Caveny et al. | |
| 5,775,425 A | 7/1998 | Weaver et al. | |
| 5,782,300 A | 7/1998 | James et al. | |
| 5,787,986 A | 8/1998 | Weaver et al. | |
| 5,833,000 A | 11/1998 | Weaver et al. | |
| 5,839,510 A | 11/1998 | Weaver et al. | |
| 5,853,048 A | 12/1998 | Weaver et al. | |
| 5,871,049 A | 2/1999 | Weaver et al. | |
| 5,908,073 A | 6/1999 | Nguyen et al. | |
| 5,960,878 A | 10/1999 | Nguyen et al. | |
| 6,047,772 A | 4/2000 | Weaver et al. | |
| 6,172,011 B1 | 1/2001 | Card et al. | |
| 6,209,643 B1 | 4/2001 | Nguyen et al. | |
| 6,837,309 B2 | 1/2005 | Boney et al. | |
| 6,877,560 B2 | 4/2005 | Nguyen et al. | |
| 7,004,255 B2 | 2/2006 | Boney | |
| 7,040,403 B2 | 5/2006 | Nguyen et al. | |
| 7,063,151 B2 | 6/2006 | Nguyen et al. | |
| 7,086,460 B2 | 8/2006 | Nguyen et al. | |
| 7,143,827 B2 | 12/2006 | Chatterji et al. | |
| 7,261,156 B2 | 8/2007 | Nguyen et al. | |
| 7,264,051 B2 | 9/2007 | Nguyen et al. | |
| 7,267,170 B2 | 9/2007 | Mang et al. | |
| 7,350,571 B2 | 4/2008 | Nguyen et al. | |
| 7,350,572 B2 | 4/2008 | Fredd et al. | |
| 7,380,600 B2 | 6/2008 | Willberg et al. | |
| 7,565,929 B2 | 7/2009 | Bustos et al. | |
| 7,578,346 B2 | 8/2009 | Fu et al. | |
| 8,016,034 B2 | 9/2011 | Glasbergen et al. | |
| 8,272,447 B2 | 9/2012 | Lee et al. | |
| 8,276,667 B2 | 10/2012 | Fu et al. | |
| 8,657,003 B2 | 2/2014 | Welton et al. | |
| 8,697,612 B2 | 4/2014 | Todd et al. | |
| 8,783,349 B2 | 7/2014 | Robisson et al. | |
| 8,789,595 B2 | 7/2014 | Guerrero et al. | |
| 8,853,137 B2 | 10/2014 | Todd et al. | |
| 8,887,803 B2 | 11/2014 | East, Jr. et al. | |
| 8,905,133 B2 | 12/2014 | Potapenko et al. | |
| 8,905,136 B2 | 12/2014 | Todd et al. | |
| 8,946,133 B2 | 2/2015 | Lee et al. | |
| 8,950,490 B2 | 2/2015 | Phatak et al. | |
| 8,960,296 B2 | 2/2015 | East, Jr. | |
| 8,985,213 B2 | 3/2015 | Saini et al. | |
| 9,023,770 B2 | 5/2015 | Todd et al. | |
| 9,051,805 B2 | 6/2015 | Johnson et al. | |
| 9,260,568 B2 | 2/2016 | Ren et al. | |
| 9,322,260 B2 | 4/2016 | Potapenko et al. | |
| 9,896,618 B2 | 2/2018 | Huang et al. | |
| 9,932,519 B2 | 4/2018 | Huang et al. | |
| 2003/0062160 A1 | 4/2003 | Boney et al. | |
| 2003/0106690 A1* | 6/2003 | Boney | C09K 8/74 166/280.1 |
| 2005/0062956 A1 | 3/2005 | Vesey et al. | |
| 2006/0042797 A1* | 3/2006 | Fredd | C09K 8/72 166/282 |
| 2006/0113077 A1 | 6/2006 | Willberg et al. | |
| 2008/0108520 A1 | 5/2008 | Fu et al. | |
| 2008/0135242 A1* | 6/2008 | Lesko | C09K 8/665 166/268 |
| 2010/0263870 A1 | 10/2010 | Willberg et al. | |
| 2011/0120712 A1 | 5/2011 | Todd et al. | |
| 2012/0285692 A1 | 11/2012 | Potapenko et al. | |
| 2013/0233553 A1 | 9/2013 | Bugrin et al. | |
| 2013/0341030 A1 | 12/2013 | Brannon et al. | |
| 2015/0159465 A1 | 6/2015 | Lecerf et al. | |
| 2016/0145483 A1 | 5/2016 | Lecerf et al. | |
| 2016/0168455 A1 | 6/2016 | Vo et al. | |
| 2016/0168968 A1 | 6/2016 | Lecerf et al. | |
| 2017/0009129 A1 | 1/2017 | Bryant et al. | |
| 2017/0145285 A1 | 5/2017 | Lafitte et al. | |
| 2017/0167222 A1 | 6/2017 | Lee et al. | |

FOREIGN PATENT DOCUMENTS

| | | |
|---|---|---|
| WO | 2009079231 A2 | 6/2009 |
| WO | 2009079233 A2 | 6/2009 |
| WO | 2009079234 A2 | 6/2009 |
| WO | 2009079235 A2 | 6/2009 |
| WO | 2009088315 A1 | 7/2009 |
| WO | 2011136678 A1 | 11/2011 |
| WO | 2013074237 A1 | 5/2013 |
| WO | 2014055089 A1 | 4/2014 |
| WO | 2015069229 A1 | 5/2015 |
| WO | 2015160275 A1 | 10/2015 |
| WO | 2015160277 A1 | 10/2015 |

OTHER PUBLICATIONS

J. Adachi, E. Siebrits, A. Peirce and J. Desroches, "Computer simulation of hydraulic fractures," International Journal of Rock Mechanics & Mining Sciences, vol. 44, pp. 739-575, 2007.

M. Heuchel, T. Sauter, K. Kratz and A. Lendlein, "Thermally induced shape-memory effects in polymers: Quantification and related modeling approaches," J. Polym. Sci. B Polym. Phys., vol. 51, p. 621-637, 2013, doi: 10.1002/polb.23251.

X. Xiao, D. Kong, X. Qiu, W. Zhang, Y. Liu, S. Zhang, F. Zhang, Y. Hu and J. Leng, "Shape memory polymers with high and low temperature resistant properties," Sci. Rep., vol. 5, p. 14137, 12 pages, 2015. doi: 10.1038/srep14137.

M. Behl and A. Lendlein, "Shape-memory polymers," Materials Today, vol. 10, p. 20, 2007.

Spurr et al., "Far-Field Diversion Agent Using a Combintion of a Soluble Particle Diverter with Specially Engineered Proppant", SPE-181851-MS, SPE Asia Pacific Hydraulic Fracturing Conference, Aug. 24-26,Beijing, China, 15 pages.

* cited by examiner

PROPPANT-FIBER SCHEDULE FOR FAR FIELD DIVERSION

The present application claims priority to U.S. Provisional Application Ser. No. 62/652,083, filed Apr. 3, 2018 and Patent Cooperation Treaty Application No. PCT/US2019/025665, filed on Apr. 3, 2019, which are both incorporated herein by reference in their entirety.

BACKGROUND

Hydrocarbons (oil, natural gas, etc.) are obtained from a subterranean geologic formation (i.e., a "reservoir") by drilling a wellbore that penetrates the hydrocarbon-bearing formation. This provides a partial flowpath for the hydrocarbon to reach the surface. In order for the hydrocarbon to be "produced," that is travel from the formation to the wellbore (and ultimately to the surface), there is a sufficiently unimpeded flowpath from the formation to the wellbore.

Hydraulic fracturing, also referred to as fracking, is an oilfield operation which is performed to stimulate a well and to increase well productivity and/or injectivity. Typically, it includes stages of pumping a fluid into a subterranean formation at a pressure which is enough to crack the formation and create or extend fractures or channels from the wellbore to the reservoir. The fracturing fluid propagates through the fractures leading to their geometrical growth. Fluids used in hydraulic fracturing may include, among other components, such as propping granules, or proppants which may enhance the hydrocarbon production capabilities of the earth formation. During the fracturing treatment, the proppants may accumulate inside the fracture and may act as supporting materials which prevent fractures from closing back after the end of the treatment, providing high conductivity flow pass from the formation to the wellbore during well production and injection.

However, during some hydraulic fracturing treatments, vertical and/or horizontal growth of an induced fracture may occur and the fracture may grow out of the desired formation upward and/or downward. Therefore, it is often advantageous to confine the induced fracture to the particular formation being treated by restricting the growth of fracture length L and/or fracture height. For example, one situation is the case of closely drilled wells. It happens more and more often that operators drill the wells very close to each other. Such wells can be vertical, horizontal or deviated. Spacing between wells can be as low as several hundred feet. Hydraulic fracturing performed in such well may result in a fracture, which may overlap with fracture(s) belonging to other wells or even may hit the other well itself. This is often an undesirable effect, and therefore control of growth of fracture length or height (depending on the mutual position of the wells) is desired. Another situation when restriction of the growth of fracture length L and/or fracture height may be beneficial is directed to the necessity to control fracture height to protect from treating upper or lower zones. For example, a production zone may have another zone above or below, and treating that zone may not be desirable. Thus, in such case, height control may be desirable to contain the fracture inside the production zone.

There are also benefits of complexity versus fracture length. Shales are formations with very low matrix permeability and with many natural fractures and high rock heterogeneity. For hydraulic fracturing in such formations, it is often more beneficial to create a developed complex network of interconnected fractures, rather than to create long and high single fractures. Such complexity may be achieved by restriction of main fracture growth thus diverting the fluid to open up and connect natural fractures.

DETAILED DESCRIPTION

Generally, embodiments disclosed herein relate to stimulation treatments to improve well performance and recovery of hydrocarbons in subterranean formations. More specifically, embodiments disclosed herein relate to a method for restricting the growth of one or more fractures formed in a far field region during a hydraulically fracturing treatment, the method involving pumping at least two stages and/or types of diverting materials into the subterranean formation. The inventors of the present disclosure have found that a plurality of fibers used in conjunction with a plurality of bridging particles may act as far field diverting agents that are capable of bridging narrow portions of a fracture tip such as those encountered during hydraulic fracturing operations. Upon bridging, these diverting materials may form a low permeability plug that may allow for a better control of the fracture by restricting the growth of a fracture height and/or length. Without being bound by the theory, it is believed that the fibers may assist the transport of the bridging materials and may reduce the permeability of a diversion pack after the bridging particles bridge at a narrow fracture tip, leading to fracture containment or far field diversion.

As defined herein, a zone refers to an interval of rock along a wellbore that is differentiated from surrounding rocks based on hydrocarbon content or other features, such as perforations or other fluid communication with the wellbore, faults, or fractures. The near-wellbore region of a zone is considered to include the matrix of the rock within a few inches of the borehole. As used herein, the near-wellbore region of a zone is considered to be anywhere within about 12 inches of the wellbore. The far field region of a zone is considered the matrix of the rock that may be beyond the near-wellbore region, that is, more than 12 inches. In one or more particular embodiments, the far field region that is treated by the present methods may be greater than 36, 60 or 120 inches from the wellbore.

In a fracturing method applied to a subterranean formation, a first stage referred to as the "pad stage" involves injecting a fracturing pad fluid into a wellbore at a sufficiently high flow rate and pressure to create at least one fracture in the subterranean formation. The pad stage is pumped until the fracture is of sufficient dimensions to accommodate the subsequent slurries pumped in the proppant stages. After the "pad stage", several stages referred to as "proppant stages" or "propped stages" are injected into the formation, in which solid proppant particles are suspended in the fluid. While conventional fracturing techniques may include the continuous introduction of proppants, embodiments may also include the periodic introduction of proppants also known as "pulse fracturing".

Figure 1:
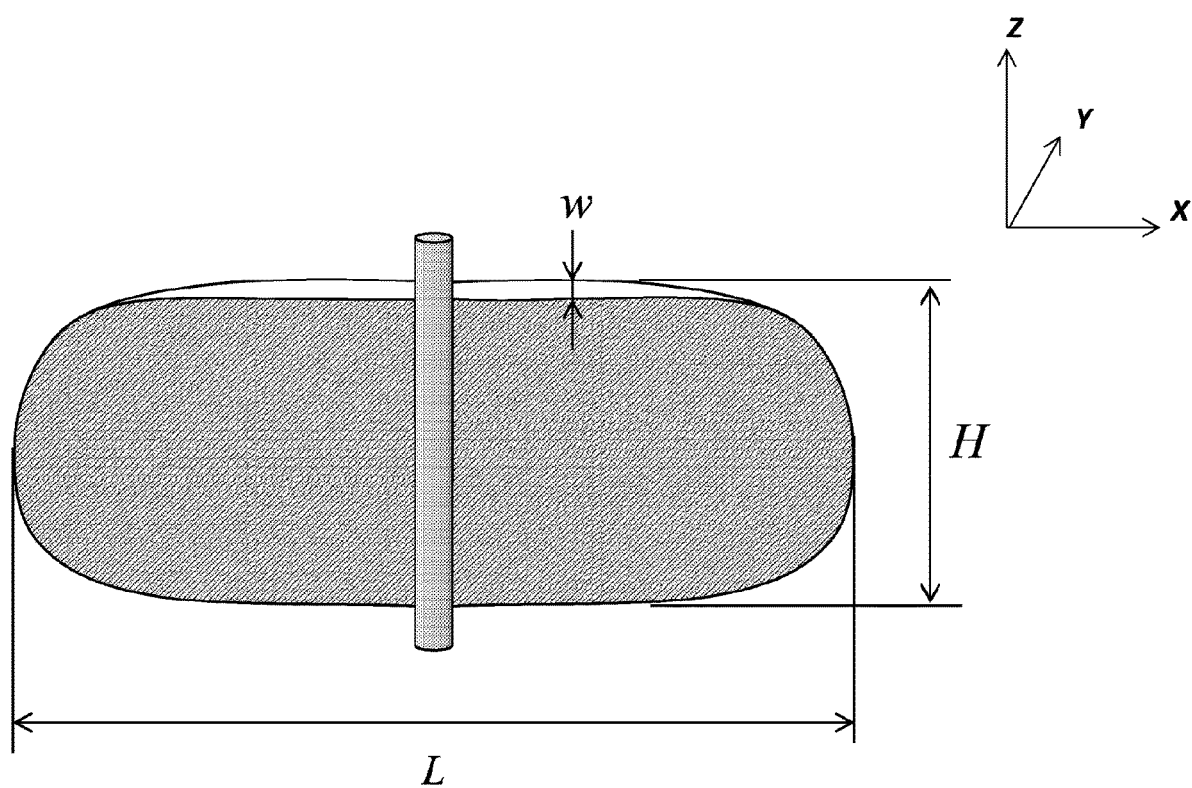
FIGS. 1 and 2 illustrate examples of geometries of a plane fracture in a well according to the present embodiments.
Figure 2:
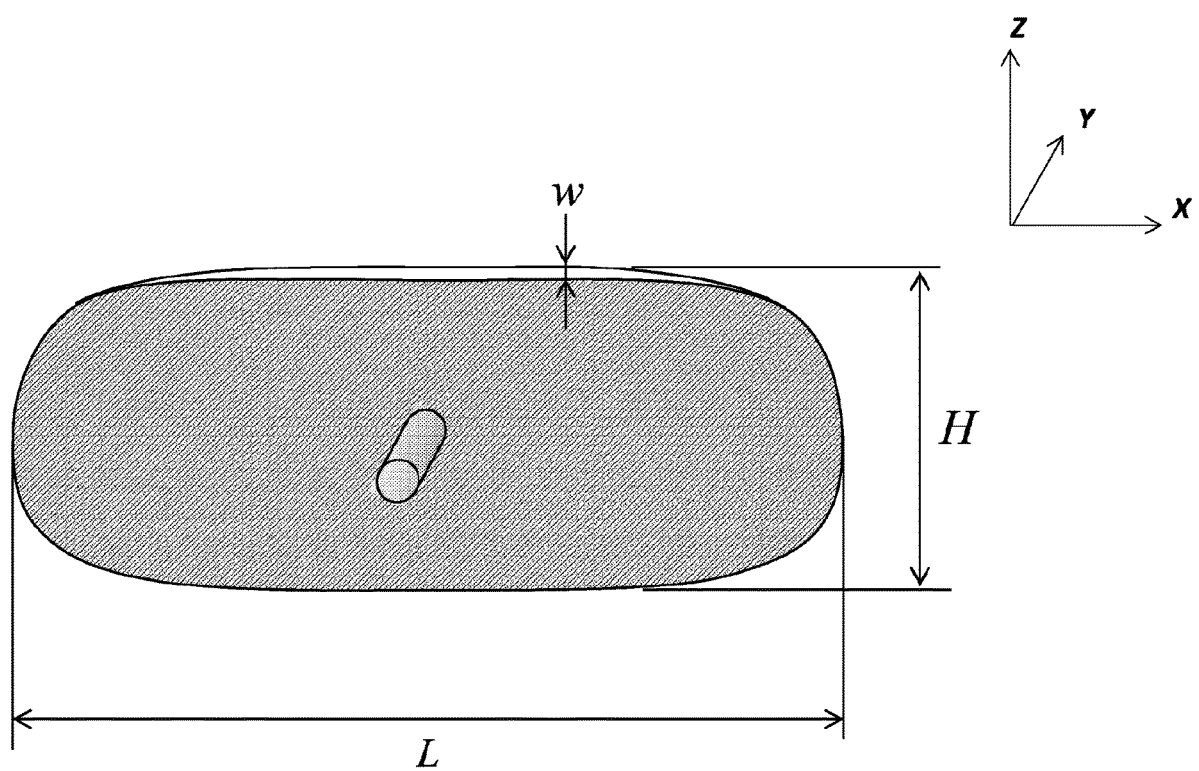

The geometry of a fracture formed during a hydraulically fracturing treatment may be very complex. For example, fractures may have tortuosity, non-planar non-symmetrical shapes, or may have complex multiple wing structures. However, for simplicity reasons, it is considered that a fracture may be described as a single plane fracture that is defined as seen in FIGS. 1 and 2 by length, L, height, H and width, w. Referring now to FIGS. 1 and 2, examples of geometries of plane fractures are depicted. For example, FIG. 1 depicts a plane fracture in a vertical well, while FIG. 2 depicts a plane fracture in a horizontal well.

Fracture growth during a hydraulic treatment and final fracture geometry after the end of the treatment are defined by mechanical laws and depend on many parameters such as distribution and anisotropy of mechanical stress in the reservoir, reservoir pore pressure, formation leak-off properties, reservoir structure, pumping fluid pressure, flowrate, viscosity, concentration and properties of solid particles.

Figure 5:
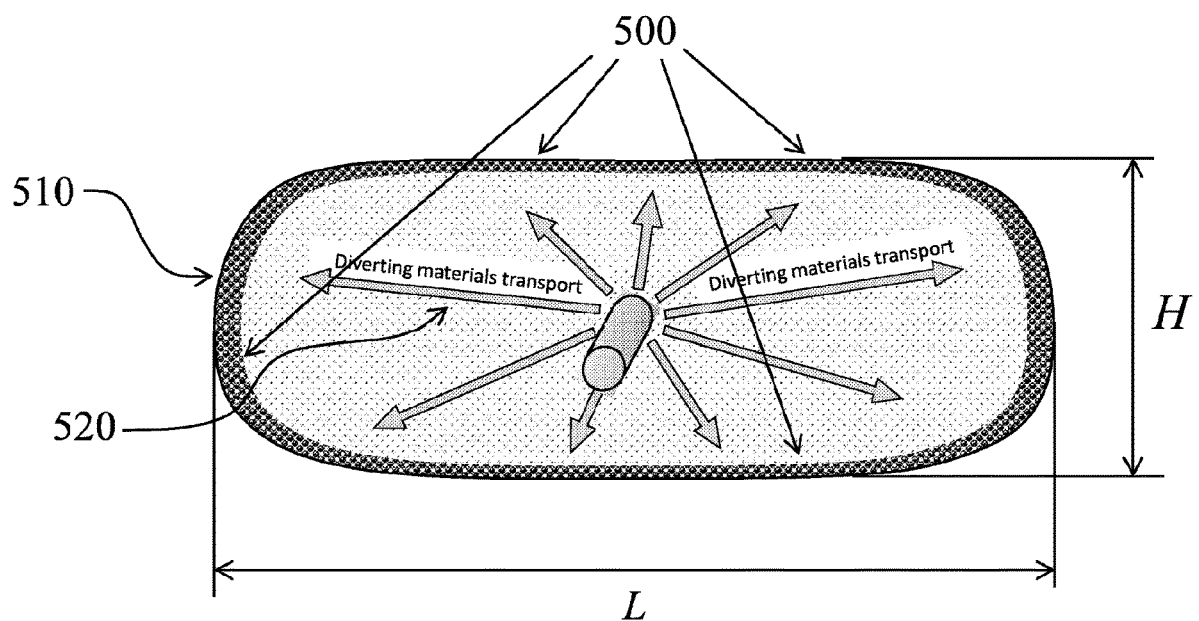
Figure 6:
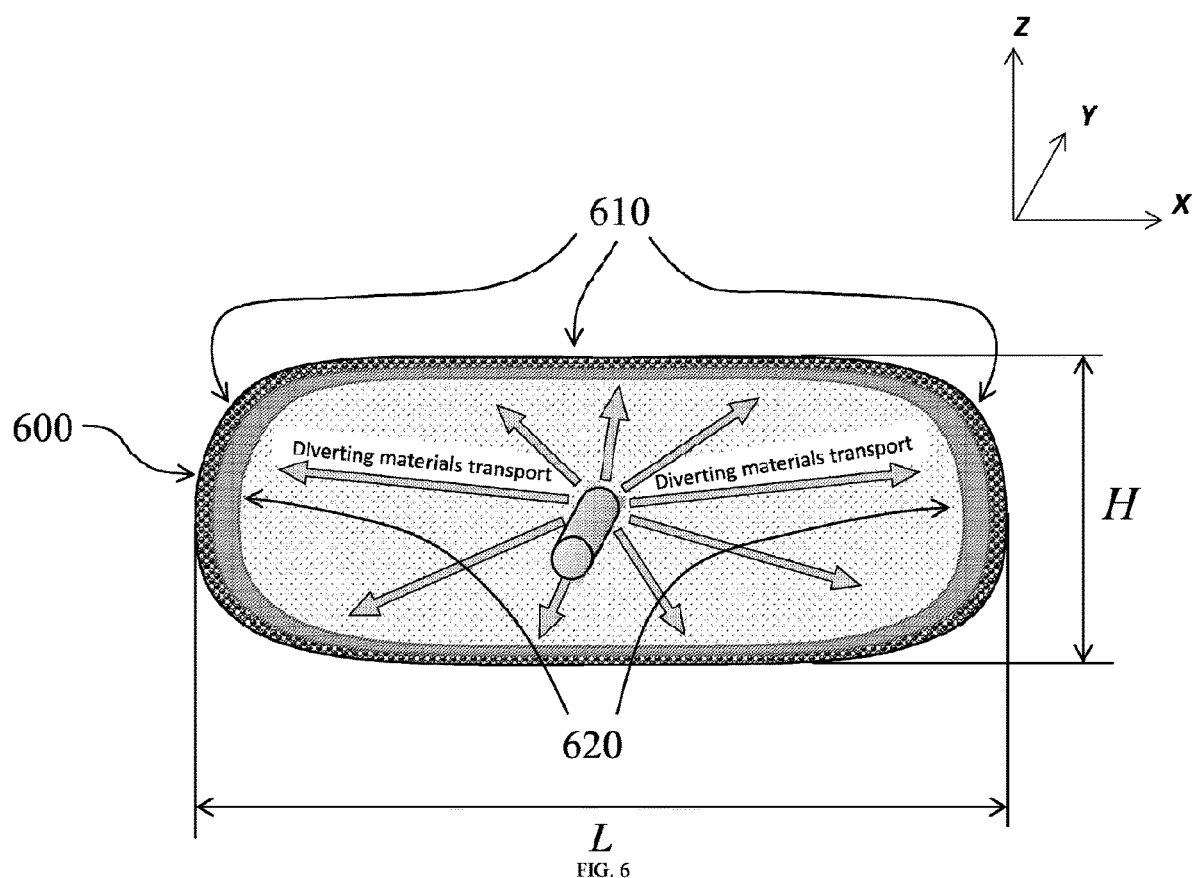
FIGS. 6-7 depict placement of two diverting materials according to the present embodiments.

According to the present embodiments, control of fracture geometry may be accomplished by stopping fracture tip propagation. This is accomplished by placing a slurry or a diverting material transport that includes at least a diverting material suspended in a carrier fluid near a fracture tip. The diverting material may provide enough hydraulic resistance to the fluid, which otherwise would move fracture tip forward, as depicted in FIGS. 5 and 6, for example, and described later in greater detail. The far field diverting material may bridge with the formation of a plug at the fracture tip, restricting the growth of a fracture length and/or fracture height. Afterwards, one or more proppant stages may be injected into the far field region until a fracture network forms. As it will be described later in greater detail, the diverting material transport may be placed uniformly or non-uniformly in the far field region depending on the direction of the growth restriction. It is also envisioned that when at least two diverting materials are used for bridging the far field region they may be introduced simultaneously or sequentially into the region.

According to the present embodiments, the far field diverting material transport may include at least two diverting materials, such as bridging materials, suspended in a carrier fluid. In one or more embodiments, the bridging materials may be selected from the group of inert, non-deformable bridging particles, fibers and mixtures of thereof. For example, in one or more embodiments, the far field diverting material may include one or more inert, non-deformable bridging particles and/or a plurality of fibers. In yet another embodiment, the far field diverting agent may include at least two bridging particles having a multimodal distribution and/or a plurality of fibers.

As described herein, using a plurality of fibers (such as cellulose fibers) and/or microfibers, as a component of the bridging material, may enable and enhance the bridging properties of the material. Various fiber materials including for example cellulose fibers may act to aid in proppant transport and therefore, help the diversion material reach the far field portions of the fracture avoiding settling ore premature bridging. For example, fibers may enable or help to keep the diversion material from spread during the transport in the wellbore and in the fracture. The properties and the concentration of the fibers may be chosen in such a manner to provide bridging at a certain distance from the wellbore or a certain width of the fracture. For example, the size of the fibers is selected to match the fracture width to effectively plug fractures of certain width. The bridging materials of the present disclosure may be designed to target a dominant direction of growth and therefore divert to contain rampant fracture height or length growth specifically.

Figure 3:
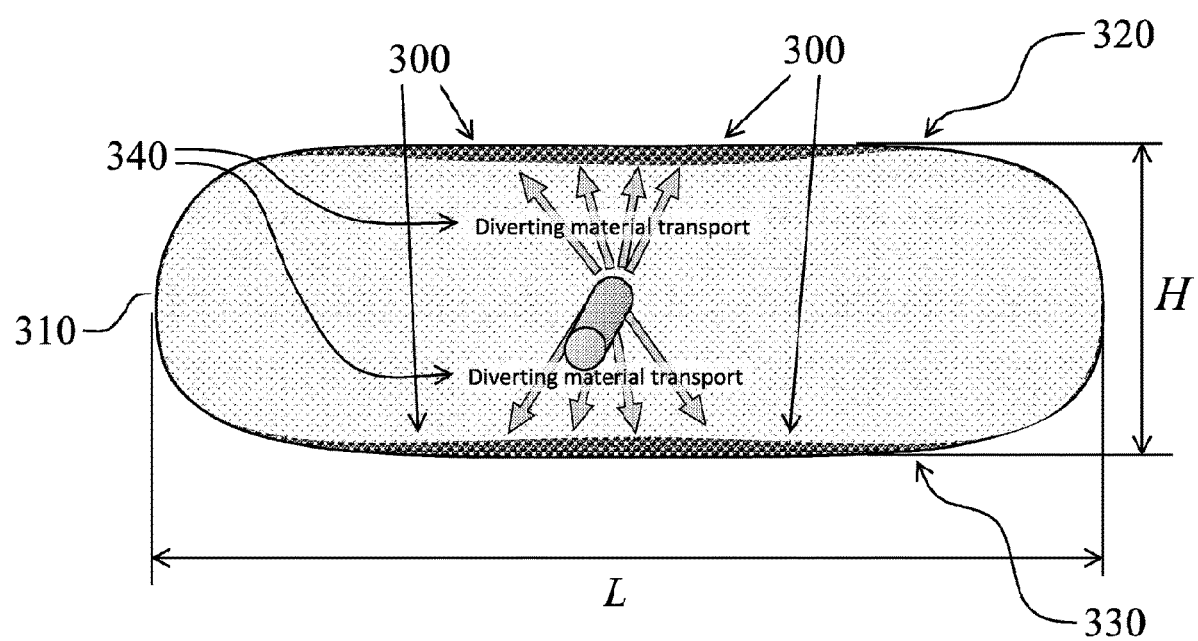
FIGS. 3-5 depict examples of placement of a bridging material according to the present embodiments.

The present disclosure may be used for height growth control which may keep the fracture contained to the hydrocarbon rich pay zones (as seen in FIG. 3) or keep the fracture length (FIG. 4) contained so that the fractures hit may be prevented in regions with closely spaced wellbore laterals. As described later in greater detail, it is also envisioned that the hydraulic fracturing method as described herein may be used for growth control of fracture height and fracture length. In such embodiments, the diverting material may be placed uniformly to all directions to provide both height and length control (FIG. 5).

Figure 7:
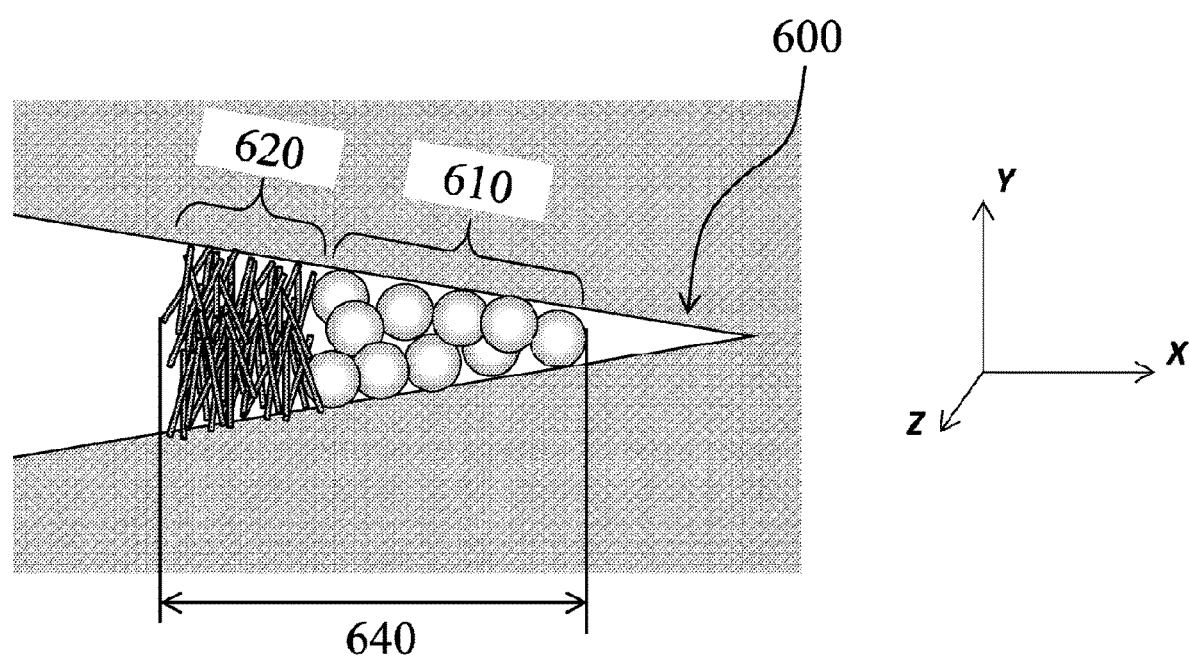
Figure 8:
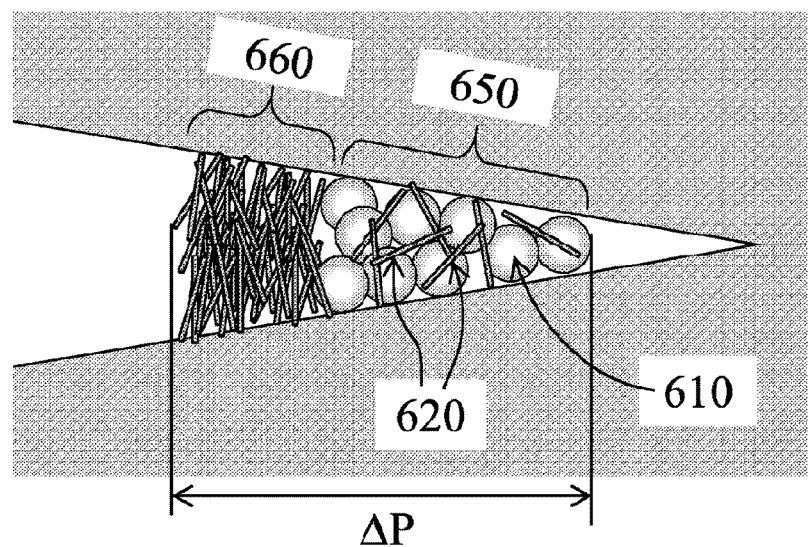
FIGS. 8 and 9 depict examples of placement of three diverting materials according to the present embodiments.
Figure 8:
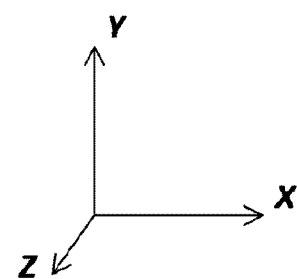

According to the present embodiments, controlling a fracture geometry involves the following stages: a) placement of a plugging slurry (such as a diverting material transport) that includes at least a diverting material (such as bridging materials) near the tip of a fracture as depicted in FIGS. 3-6; b) bridging of the bridging particles at the place where the fracture is narrow enough, as seen for example in FIGS. 5-6; and c) accumulation of solid particles (such as fibers) starting at the place of bridging to form a plug of low permeability (as seen for example in FIGS. 6, 7 and 8). Without being bound by the theory, it is believed that if such a plug is deep enough and has a permeability that is low enough, the propagation of the fracture tip may be stopped due to massive energy losses to overcome the plug resistance. As noted above, it was found by the present inventors that the addition of a plurality of fibers to a plurality of bridging particles may enable or improve the efficiency of stages a) through c) described above. In addition, the fibers may provide a certain viscosity to the diverting material transport that may allow the bridging particles to reach the fracture tip. According to the present embodiments, the viscosity of the plugging slurry may be at least 4 cP at 511 $s^{-1}$. The far field diversion methods as described herein may be used for a first time fracturing operation, as well as for re-fracturing operations.

According to the present embodiments, the inert, non-deformable bridging particles may include proppants used in general in fracturing operations. According to the present embodiments, the proppant materials may be selected from, but are not limited to, ceramic proppants, sand, organic polymers, plastics and mixtures of thereof. The sizes of the particles may vary depending on the desired results of the fracturing treatment. However, in particular embodiments, the size of the diverting material bridging particles may be larger than the size of proppant(s) used in later stages to prop open the fractures. According to the present embodiments, the bridging particles may have a monomodal or a multimodal distribution. For example, in one or more embodiments, the size of the bridging particles may be 100 mesh. It is also envisioned that bimodal bridging particles may be used as well. In such embodiments, the size of the bridging particles may be 40/70, or 30/50, or 20/40 or 16/30 or 16/20. The proppants as described herein may have a diameter in the range of 0.01 to 10 mm, where the lower limit can be any of 0.01 mm, 0.05 mm, 1 mm, 5 mm and the upper limit can be any of 5 mm, 7.5 mm or 10 mm, where any lower limit can be used with any upper limit. According to the present embodiments, concentration of the proppant may vary in the range of 0.01 to 10 ppa, where the lower limit can be any of 0.01, 0.05 ppa or 1 ppa and the upper limit can be any of 5 ppa, 7.5 ppa or 10 ppa, where any lower limit can be used with any upper limit. As defined herein, ppa is directed to pounds proppant added.

In one or more embodiments, the first bridging materials pumped in the first stage of the fracturing operation, as described above, may include large proppant particles. In such embodiments, the total amount of proppant placed during the first stage may be varied in the range of 100 lb to 100000 lb. It is also contemplated that such first bridging materials may be pumped at any stage in the treatment.

In one or more embodiments, the fibers may be selected from the group of polymer fibers. The fibers that have shown utility in the present disclosure may be selected from the group of cellulose fibers or cellulose derivatives fibers. It is also envisioned that fibers selected from the group of organic polymers may be used. Cellulose pulp, produced largely from sawmill residue and recycled paper as well as logs and chips, is a refined product that finds its primary applications in the paper industry. It is one of the most abundant raw materials on earth, and can be tailored to a specific application by varying the source material and processing stages to produce a wide variety of fibrous cellulose products. The pulp can be fractionated to give fibers of varying lengths (10 microns to 10 mm) and diameters (5-100 micron). According to the present embodiments, the cellulose fibers are dispersed in a carrier fluid, which, as defined herein, may be any fluid used in hydraulic fracturing. In one or more embodiments, the carrier fluid may be selected, but not limited to guar based linear or cross-linked gel, slick water, it can be also foam based fluid or other water or oil based fluids.

According to the present embodiments, the concentration of the fibers may range from 0.1 to 1000 ppt (ppt is a pound of fibers per thousand gallons of clean fluid, ppt=lb/1,000 US gal), where the lower limit can be any of 0.1 ppt, 0.5 ppt, 1 ppt, 5 ppt or 10 ppt and the upper limit can be any of 150 ppt, 500 ppt, 750 ppt or 1000 ppt, where any lower limit can be used with any upper limit. For example, the concentration of the fibers added in the first stage of the fracturing operation may range from 0.1 to 1500 ppt.

The fibers that have shown utility in the present disclosure may exhibit the following properties: a) have a fiber aspect ratio that ranges from 1.5 to 1000; b) the fiber length may range from about 0.05 mm to about 30 mm, or from 0.05 mm to about 10 mm, or from about 0.1 mm to about 30 mm; c) the diameter of the fibers may range from about 5 µm to about 100 µm, where the lower limit can be any of 5 µm, 10 µm, 20 µm and the upper limit can be any of 50 µm, 80 µm and 100 µm, where any lower limit can be used with any upper limit.

The amount of the fibers used in the fracturing treatment may vary, as described later in greater detail, depending on the stage of the fracturing treatment when they are introduced into the fracture. In one or more embodiments, the concentration of the fibers may range from 0.1 to 30% of the total mass of solid particles in the bridging materials. It is also envisioned that the total amount of fibers that are used during the fracturing operation may vary from about 100 to about 10000 lbs.

As described herein, the bridging particles and the fibers are dispersed in a carrier fluid. According to the present embodiments, the carrier fluid may be any fluid used in hydraulic fracturing.

The placement of a diverting material transport that includes at least a bridging material into a fracture is dictated by the desired direction of the growth restriction. For example, when control of the fracture height is desired, the diverting transport material may be placed predominantly at the top and bottom of the fracture, as shown in FIG. 3. Referring now to FIG. 3, a fracture 310 having a length L and a height H is illustrated. A diverting material transport 340 that includes at least a diverting material (such as a plurality of bridging particles) is placed non-uniformly near the top 320 and the bottom 330 of the fracture 310, in such a manner that the bridging material 300 included into the diverting material transport 340 may bridge at the top 320 and the bottom 330 tip of the fracture restricting this way the growth of the fracture along its height, H.

Figure 4:
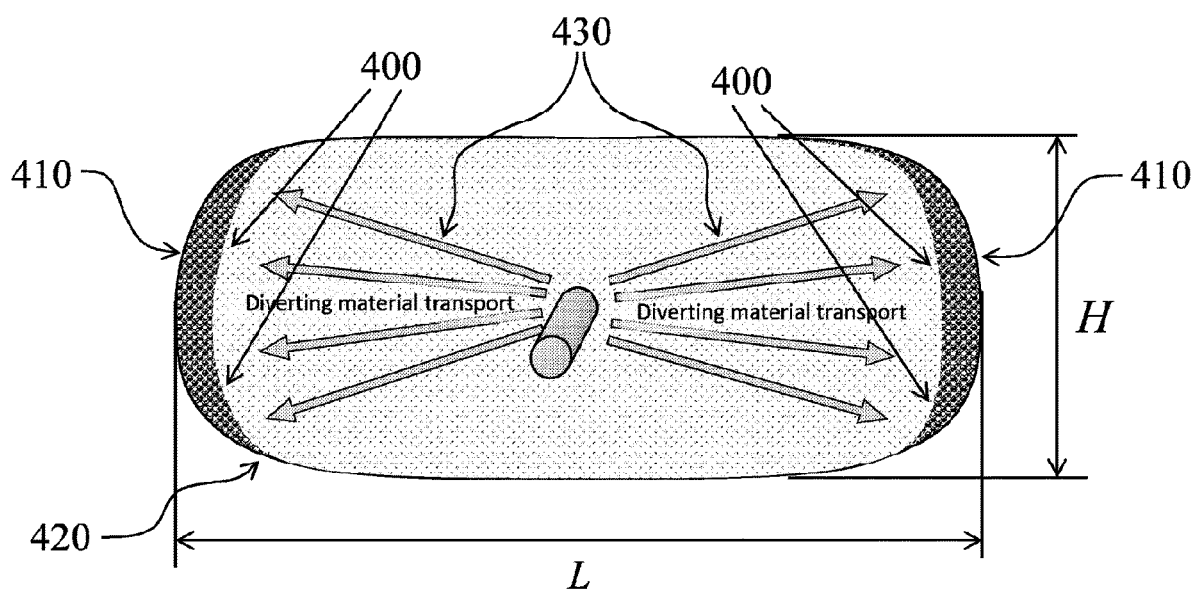

In yet another embodiment, the diverting material transport 430 that includes at least a bridging material may be placed non-uniformly towards the wings of a fracture, as seen in FIG. 4. FIG. 4 shows that upon bridging of the bridging material 400 along the wings 410 of the fracture 420 with the formation of a plug, growth of the fracture length may be restricted.

It is also envisioned that at least one diverting material transport may be introduced uniformly into a far field region. In such embodiments, the diverting material transport may include a plurality of bridging particles and/or fibers, where the bridging particles may have a monomodal or multimodal distribution. Referring now to FIG. 5, a uniform placement of a diverting material transport 520 into a fracture 510 is depicted. In such embodiments, the bridging material 500 may uniformly bridge at the tip of the fracture 510, restricting the growth of the fracture length and/or height.

According to the present embodiments, at least two bridging materials may be placed into a far field region. As noted above, the placement of the bridging materials is determined by the desired direction of growth restriction. In one or more embodiments, two bridging materials, such as a first and a second bridging material, may be placed uniformly, as seen in FIG. 6. In such embodiments, the two bridging materials may be introduced simultaneously or sequentially into the fracture.

FIG. 6 depicts the uniform placement of two diverting materials into a fracture 600, where a first and a second plurality of bridging materials are introduced sequentially. In such embodiments, a first diverting material transport that includes a first bridging material 610 is placed uniformly on the outer perimeter of a fracture 600. The first bridging material 610 may bridge near the fracture tip with the formation of a plug. In such embodiments, the first bridging material may be a large proppant. The size of the bridging material may be 100 mesh or 40/70, or 30/50 or 20/40 or 16/30 or 16/20. Fibers may be added to first bridging material 610 (such as a proppant) for better transport but are not required. The second bridging material 620 (such as for example cellulose fibers dispersed in a carrier fluid) may be transported towards the fracture tip and may accumulate on the surface of the bridge formed by the first bridging material 610, with the formation of a low permeability plug which has high resistance to the fluid flow. As fluid can no longer flow into fracture, the fracture extension is restricted. Such embodiments may include more stages of diversion if desired (not shown). In embodiments when the first bridging material is sand and the second bridging material is a plurality of fibers, the fibers may be introduced in an amount of 5-100 less than the amount of sand.

According to the present embodiments, the concentration of the fibers pumped in this stage of the fracturing operation may be varied within the limits of 0.1-1000 ppt. In such embodiments, the fiber material may be any polymeric fiber, such as for example cellulose fibers. The amount of the fibers pumped during this stage may be varied within the range of 10-30000 lb. The first and the second stage of the fracturing operation may be pumped sequentially, one after another, or may be spaced with clean fluid or with a proppant laden stage. According to the present embodiments, the first stage may be pumped at the beginning of the pad, during the pad or after the pad.

In such embodiments the first bridging agent may be selected from the group of inert non-deformable bridging materials and the second bridging material may be selected from the group of naturally derived fibers such as cellulose fibers. The mechanism of restricting the growth of a fracture height and/or length when the two bridging materials, 610 and 620 are pumped sequentially into a far field region of a fracture 600 is depicted in FIG. 7. FIG. 7 shows the formation of the plug formed by the first bridging material 610 (such as bridging particles) on top of which the second bridging material 620 (such as fibers) accumulate with the formation of a low permeability plug 640. As described below in greater detail, the bridging particles 610 may provide effective bridging due to the large size of the particles, while the second bridging material may provide the formation of a layer with very low permeability to provide overall high resistance to the fluid flow, thus enabling effective far field diversion.

It is also envisioned that the first bridging material 610 may be intermingled with a first plurality of fibers 620 with the formation of a plug 650 as seen in FIG. 8. In such embodiments, the second bridging material 660 (such as a second plurality of fibers) may accumulate on the surface of the plug 650 formed by the first bridging material 610 and the first plurality of fibers 620 with the formation of a low permeability plug. In such embodiments, the first plurality of fibers 620 may be selected from the group of organic polymers. As noted above, the first bridging material 610 may have a size large enough to bridge the far field region. It is also envisioned that the first bridging material 610 may have a monomodal and/or multimodal distribution. In such embodiments, the first 620 and the second plurality of fibers 660 may be the same, having the same length and diameter, or may be different.

As noted above, it is also envisioned that the diverting materials may be pumped simultaneously and uniformly. In embodiments where a first bridging material and a second bridging material are introduced simultaneously into a fracture, they may intermingle with the formation of a bridge. This is exemplified in FIG. 5. In such embodiments, a first bridging agent and a plurality of fibers suspended in a carrier fluid are pumped into a far field region, being placed near the outer border (perimeter) of the growing fracture. The bridging fibers and the fibers intermingle with the formation of a plug. As noted above, the bridging particles may have a size big enough to bridge next to the fracture tip. In one or more embodiments, the bridging particles may have a multimodal distribution.

Figure 9:
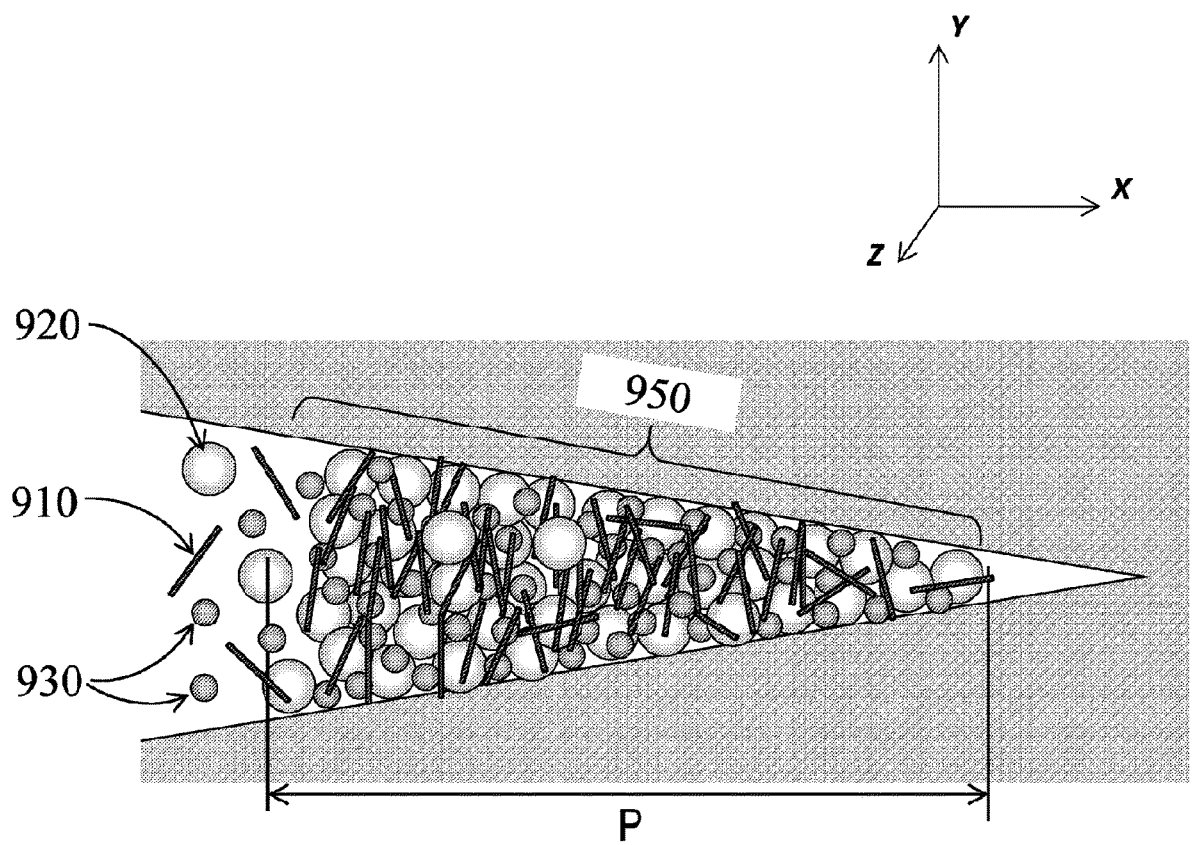

For example, in one or more embodiments, the bridging particles may have a bimodal distribution, as represented in FIG. 9. FIG. 9 represents the mechanism of bridging a far field region when a plurality of fibers 910 is intermingled with a bridging material that has a bimodal distribution (such as large and small bridging particles, 920 and 930, respectively). In such embodiments, the bridging materials may be pumped early in the proppant portion of the treatment. As these materials are transported through the fracture towards the narrower fracture widths, the larger particles will begin to bridge and the smaller particles will begin to pack off along with the fiber in a manner similar to filtration by a system of bridged particles. Fibers with small length may efficiently plug the pore space in the pack and may provide low permeability for the pack, thus enabling stop of fracture tip propagation.

Referring to FIG. 9, the fibers 910 transport the large and the small bridging particles 920, and respectively 930, towards the fracture tip with the formation of a low permeability plug 950. The fibers may also act as bridging and permeability reducing fibers.

It is also envisioned that at least one bridging material may be pumped not solely before the proppant stages, but after a portion of proppant is placed in the fracture. In one or more embodiments, there may be multiple portions of bridging material pumped during one stage of fracturing, altered with portions of proppant or clean fluid in between them in any combinations.

One embodiment of the present disclosure involves a method of hydraulically fracturing a subterranean formation penetrated by a wellbore. In such an illustrative embodiment, the method includes pumping a fracturing pad fluid into the subterranean formation under conditions of sufficient rate and pressure to create at least one fracture in the subterranean formation. As noted above, the fracturing pad fluid may include a carrier fluid and a plurality of bridging particles, where the bridging particles may form a bridge at a far field fracture tip. Afterwards, a first plurality of fibers is pumped into the subterranean formation to form a low permeability plug with the bridging particles. Next, a proppant fluid comprising a plurality of proppant particles may be pumped. In one or more embodiments, the fracturing pad fluid may include the first plurality of fibers such that the first plurality of fibers is intermingled with the bridging particles to form the bridge. In such embodiments, the first plurality of fibers may be pumped sequentially after the bridging particles such that the first plurality of fibers may form a deposit on the bridge.

It is also envisioned that the fracturing pad fluid may further include a second plurality of fibers such that the second plurality of fibers are intermingled with the bridging particles to form the bridge on which the first plurality of fibers are deposited. In such embodiments, the second plurality of fibers may be added in a concentration of 0.1 to 600 ppt. As noted above, the plurality of bridging particles and the first plurality of fibers may be introduced in the subterranean formation in such a manner to control a height and/or length of the at least one fracture formed in the subterranean formation.

Another embodiment involves a method of treating a subterranean formation zone that is substantially distanced from a wellbore. In such an illustrative embodiment, the method includes pumping a plugging slurry into a far field region of a treatment zone of the subterranean formation, pumping a first plurality of fibers into the far field region to form a low permeability plug with the plurality of bridging particles, pumping a proppant fluid into the far field region of the treatment zone of the subterranean formation, wherein the proppant fluid comprises a plurality of proppant particles and continuing pumping the proppant fluid into the far field region until a fracture network forms. In such embodiments, the plugging slurry may include a carrier fluid and a plurality of bridging particles having a particle size sufficient to control a geometry of at least a fracture in a far field region. According to the previous embodiments, the bridging particles and the proppant particles may be selected from the group of sand and ceramic proppants. For example, the size of the bridging particles used in the pad stage may be greater or equal to the size of the proppant particles used in the proppant stage. In one or more embodiments, the fracturing pad fluid may include the first plurality of fibers such that the first plurality of fibers are intermingled with the bridging particles to form the bridge. In yet another embodiment the first plurality of fibers are pumped sequentially after the bridging particles such that the first plurality of fibers form a deposit on the bridge. It is also envisioned that the fracturing pad fluid may further include a second plurality of fibers such that the second plurality of fibers are intermingled with the bridging particles to form the bridge on which the first plurality of fibers are deposited. In such embodiments, the plugging slurry may have a viscosity of at least 4 cP at 511 s$^{-1}$. It is also envisioned that the treating method may further include pumping a diversion fluid, where the diversion fluid is pumped during the proppant stage. It is also contemplated that a fluid carrying the bridging particles/fibers may have a significantly higher viscosity than the pad fluid.

In all the above embodiments, the total amount of fibers used, such as the first and the second plurality of fibers may range from about 100 to 10000 lbs.

EXAMPLES

The following examples are presented to further illustrate the preparation and properties of the fracturing fluids of the present disclosure and should not be construed to limit the scope of the disclosure, unless otherwise expressly indicated in the appended claims.

Without being bound by the theory, it is believed that the main factor that drives the far field diversion is a pressure drop $\Delta P$ on the diverting plug as shown in FIG. 4. In the assumption of Darcy flow through the pack, the pressure drop on each of the materials 1 and 2 is proportional to each pack length (which is driven by each material bulk density) and inversely proportional to each pack permeability.

Figure 10:
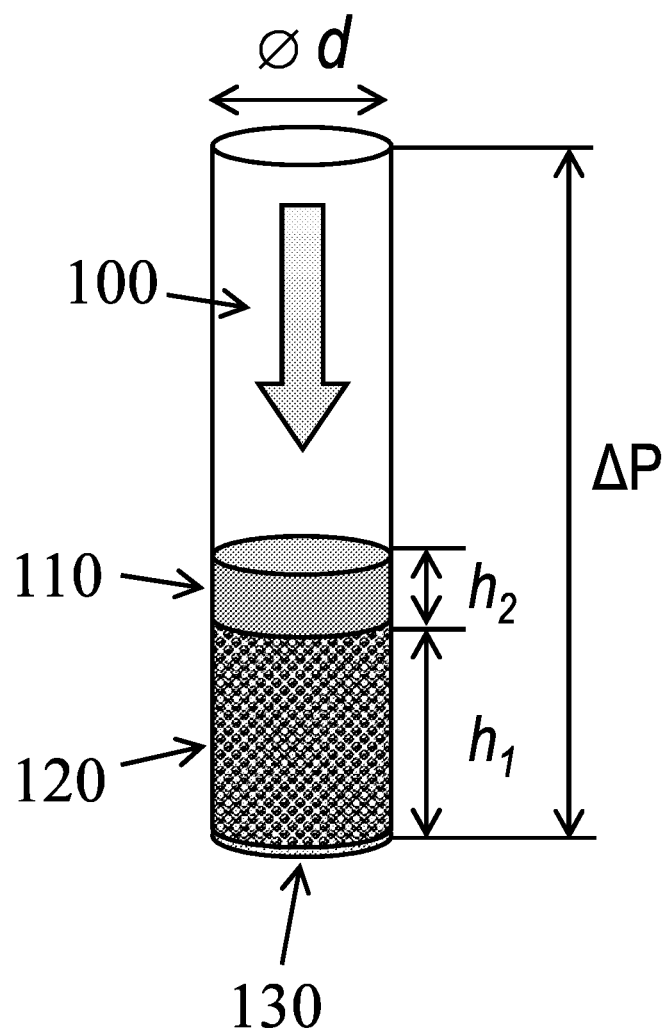
FIG. 10 shows a setup for measuring permeabilities of the packs of diverting materials according to the present embodiments.

Potential candidates for a first and a second diversion material, 120 and 110, respectively, were tested in the setup shown in FIG. 10. 100 represents the water flow and 130 represents 100 mesh screen. Setup includes of a cylindrical tube filled with a pack of first material and topped with a pack of a second material. The height h2 was varied and the pressure drop $\Delta P$ was measured in the tests. Set of experiments enabled measuring separately permeabilities of the pack of the first diverting material and pack of the second diverting material. Bulk density of each packs was also measured.

Flow through the pack Q had being increased during the test, and total pressure drop $\Delta P$ was measured as a function of Q. In a Darcy regime, total pressure drop is proportional to the flowrate:

$$\Delta P = \Delta P_1 + \Delta P_2 = \frac{4Q\mu}{\pi d^2} \cdot \left(\frac{h_1}{k_1} + \frac{h_2}{k_2}\right) \quad (1)$$

where $\mu$ is a water viscosity, $\pi d^2/4$ is the tube inner section area, and $k_1$, $k_2$ represent the permeability of a first and second pack respectively. Fitting of the experimentally measured response $\Delta P(Q)$ gives the value for the expression $$\left(\frac{h_1}{k_1} + \frac{h_2}{k_2}\right),$$

where $h_1$ and $h_2$ are known values. Heights $h_1$ and $h_2$ were calculated based on the masses of each sample and values of their bulk densities $\rho_1$ and $\rho_2$ respectively. Since the first diverting material 120 may be a standard sand, the value of $\rho_1$ was taken from the sand specification. For a second material its stress-dependent bulk density $\rho_2$ was measured in a separate test. Amount of second diverting material 110 was changed from test to test, which provided different pressure response $\Delta P(Q)$. Analysis of that dependence enabled determination of permeability of pack of a second material $k_2$.

In the described tests, Badger Sand 30/50 was used as a first diverting material 120. Cellulose fibers with a mean length of 2 mm were used as a second diverting material 110. The measured values of cellulose fibers pack bulk density and pack permeability are shown in Table 1. Other items shown in the Table 1, such as the data for "Badger Sand" of different sizes are included for comparison. As seen in Table 1, cellulose fibers show great potential for being used as a second diverting material, since they have much lower permeability and about three times lower bulk density as typical sand. It means for example that similar mass of this specific cellulose fibers may provide ~1100 times higher pressure drop when packed than Badger Sand 70/140.

In one of the embodiments said bridging material is pumped early in the proppant portion of the treatment. As this material is transported through the fracture towards the narrower fracture widths, the larger particles will begin to bridge and the smaller particles will begin to pack off along with the fiber in a manner similar to filtration by a system of bridged particles (FIG. 9). Fibers with small length will efficiently plug the pore space in the pack and will provide low permeability for the pack, thus enabling stop of fracture tip propagation.

TABLE 1

Measured permeability and bulk density of the pack of cellulose fibers.

| Material | Pack bulk density | Pack permeability, Darcy |
| --- | --- | --- |
| Badger Sand 20/40 | 1.55 | 216 |
| Badger Sand 30/50 | 1.55 | 103 |
| Badger Sand 40/70 | 1.55 | 59 |
| Badger Sand 100 mesh | 1.43 | 21 |
| Cellulose fibers | 0.49 | 0.06 |

Advantageously, embodiments of the present disclosure provide far field diversion methods that allow length and/or height fracture growth control by placing at least two diverting materials near the outer border (perimeter) of a growing fracture during a hydraulically fracturing treatment. Specifically, it was found that a plurality of fibers used in conjunction with a plurality of bridging particles may act as far field diverting agents that are capable of bridging narrow portions of a fracture tip by forming a low permeability plug that allows for a better control of the fracture.

Although the preceding description has been described herein with reference to particular means, materials, and embodiments, it is not intended to be limited to the particulars disclosed herein; rather, it extends to all functionally equivalent structures, methods and uses, such as are within the scope of the appended claims.

What is claimed:
1. A method, comprising:
pumping a first stage consisting essentially of a fracturing pad fluid into a subterranean formation under conditions of sufficient rate and pressure to create at least one fracture in the subterranean formation, the fracturing pad fluid consisting essentially of a carrier fluid and a plurality of bridging particles, the plurality of bridging particles forming a bridge in a fracture tip within a far field region of the formation;

then, pumping a second stage comprising a fluid consisting essentially of a first plurality of fibers into the subterranean formation to form a plug with the plurality of bridging particles directly after pumping the first stage; and then, pumping a third stage comprising a proppant fluid consisting essentially of a plurality of proppant particles after pumping the second stage.

2. The method of claim 1, wherein the plurality of bridging particles have a diameter ranging from 0.1 to 10 mm.

3. The method of claim 2, wherein the plurality of bridging particles have a monomodal or a multimodal distribution.

4. The method of claim 1, wherein the first plurality of fibers comprises a first quantity of the first plurality of fibers, and wherein the fracturing pad fluid further consists essentially of a second quantity of the first plurality of fibers such that the second quantity of the first plurality of fibers are intermingled with the plurality of bridging particles to form the bridge after pumping the fracturing pad fluid into subterranean formation.

5. The method of claim 1, wherein the first plurality of fibers are pumped sequentially via the fluid after the plurality of bridging particles in the fracturing pad fluid such that the first plurality of fibers form a deposit on the bridge.

6. The method of claim 5, wherein the fracturing pad fluid further consists essentially of a second plurality of fibers such that the second plurality of fibers are intermingled with the plurality of bridging particles to form the bridge on which the first plurality of fibers are deposited.

7. The method of claim 6, wherein the second plurality of fibers is added in a concentration of 0.1-600 ppt (pounds per thousand gallons).

8. The method of claim 1, wherein the first plurality of fibers are selected from the group of cellulose and cellulose derivatives fibers.

9. The method of claim 1, wherein the first plurality of fibers are selected from the group of organic polymers.

10. The method of claim 1, wherein the first plurality of fibers have an aspect ratio of 1.5 to 1000 and a length ranging from 0.05 mm to 30 mm.

11. The method of claim 1, wherein the fracturing pad fluid has a viscosity of at least 4 cP at 511 s-1.

12. The method of claim 1, wherein the plurality of bridging particles and the first plurality of fibers are introduced in the subterranean formation in such a manner to control a height and/or a length of the at least one fracture formed in the subterranean formation.

13. The method of claim 1, wherein the plurality of bridging particles have respective particle sizes equal to or greater than respective particle sizes of the plurality of proppant particles.

14. The method of claim 1, wherein the plurality of bridging particles and the plurality of proppant particles are selected from the group of sand and ceramic proppants.

15. A method, comprising:
pumping a first stage consisting essentially of a plugging slurry non-uniformly into a far field region of a treatment zone of a subterranean formation, the plugging slurry consisting essentially of:
a carrier fluid; and
a plurality of bridging particles having a particle size sufficient to control a geometry of at least a fracture in a far field region, the plurality of bridging particles forming a bridge in a fracture tip within the far field region;

pumping a second stage comprising a fluid consisting essentially of a first plurality of fibers into the far field region to form a plug with the plurality of bridging particles directly after pumping the first stage;

pumping a third stage comprising a proppant fluid into the far field region of the treatment zone of the subterranean formation after pumping the second stage, wherein the proppant fluid consists essentially of a plurality of proppant particles; and continuing pumping the proppant fluid into the far field region until a fracture network forms.

16. The method of claim 15, wherein the plurality of bridging particles have a diameter ranging from 0.1 to 10 mm.

17. The method of claim 15, wherein the plurality of bridging particles have a monomodal or a multimodal distribution.

18. The method of claim 15, wherein the first plurality of fibers comprises a first quantity of the first plurality of fibers, and wherein the plugging slurry further consists essentially of a second quantity of the first plurality of fibers such that the second quantity of the first plurality of fibers are intermingled with the plurality of bridging particles to form the bridge after pumping the plugging slurry.

19. The method of claim 15, wherein the first plurality of fibers are pumped sequentially via the fluid after the plurality of bridging particles in the plugging slurry such that the first plurality of fibers form a deposit on the bridge.

20. The method of claim 19, wherein the plugging slurry further consists essentially of a second plurality of fibers such that the second plurality of fibers are intermingled with the plurality of bridging particles to form the bridge on which the first plurality of fibers are deposited.

21. The method of claim 20, wherein the second plurality of fibers is added in a concentration of 0.1-600 ppt.

22. The method of claim 20, wherein the first and the second plurality of fibers are selected from the group of cellulose and cellulose derivatives fibers.

23. The method of claim 20, wherein the first and the second plurality of fibers have an aspect ratio of 1.5 to 1000 and a length ranging from 0.05 mm to 30 mm.

24. The method of claim 20, wherein an amount of the first and the second plurality of fibers ranges from 100 to 10000 lbs.

25. The method of claim 15, wherein the plugging slurry has a viscosity of at least 4 cP at 511 s-1.

26. The method of claim 15, wherein the plurality of bridging particles have respective particle sizes equal to or greater than respective particle sizes of the plurality of proppant particles.

27. The method of claim 15, further comprising pumping a diversion fluid, wherein the diversion fluid is pumped during the second stage.

28. The method of claim 15, wherein the plurality of bridging particles and the proppant particles are selected from the group of sand and ceramic proppants.

* * * * *